United States Patent

Damlis et al.

[11] Patent Number: 5,259,730
[45] Date of Patent: Nov. 9, 1993

[54] IMPINGEMENT COOLED AIRFOIL WITH BONDING FOIL INSERT

[75] Inventors: Nicholas Damlis, Cincinnati; James A. Martus, West Chester; Edward H. Goldman, Cincinnati, all of Ohio

[73] Assignee: General Electric Company, Cincinnati, Ohio

[21] Appl. No.: 15,872

[22] Filed: Feb. 10, 1993

Related U.S. Application Data

[63] Continuation of Ser. No. 787,345, Nov. 4, 1991, abandoned.

[51] Int. Cl.$^5$ ............................................. F01D 5/18
[52] U.S. Cl. ................................. 416/96 A; 416/97 R
[58] Field of Search ............... 416/95, 96 R, 96 A, 416/97 R, 97 A; 415/115; 29/889.7, 889.72, 889.721, 889.722

[56] References Cited

U.S. PATENT DOCUMENTS

| | | | |
|---|---|---|---|
| 2,656,146 | 10/1953 | Sollinger . | |
| 2,696,364 | 12/1954 | Bartlett . | |
| 2,779,565 | 1/1957 | Bruckmann | 416/96 A |
| 2,801,073 | 7/1957 | Savage | 416/96 A |
| 2,873,944 | 2/1959 | Wiese et al. | 416/96 A |
| 2,923,525 | 2/1960 | Creek . | |
| 3,635,587 | 1/1972 | Giesman et al. | 416/96 A |
| 3,656,222 | 4/1972 | Jones . | |
| 4,033,792 | 7/1977 | Giamei et al. | 416/96 A |
| 4,089,456 | 5/1978 | Toppen et al. . | |
| 4,183,716 | 1/1980 | Takahara et al. | 416/96 A |
| 4,437,810 | 3/1984 | Pearce | 416/96 A |
| 4,501,053 | 2/1985 | Craig et al. . | |
| 4,697,985 | 10/1987 | Suzuki | 416/96 A |
| 4,946,346 | 8/1990 | Ito | 416/96 A |

FOREIGN PATENT DOCUMENTS

| | | | |
|---|---|---|---|
| 853499 | 10/1970 | Canada | 416/96 A |
| 879485 | 4/1953 | Fed. Rep. of Germany | 416/96 A |
| 59-200001 | 11/1984 | Japan . | |
| 716612 | 10/1954 | United Kingdom | 416/96 A |
| 754217 | 8/1956 | United Kingdom | 416/97 R |
| 1078116 | 8/1967 | United Kingdom . | |
| 1222565 | 2/1971 | United Kingdom . | |

Primary Examiner—Edward K. Look
Assistant Examiner—James A. Larson
Attorney, Agent, or Firm—Jerome C. Squillaro

[57] ABSTRACT

An impingement cooled airfoil is fabricated by diffusion bonding a pair of airfoil half-sections together using an insert which is prefabricated from diffusion bonding foil. The insert is perforated so as to act as an impingement baffle. Axially-extending ribs may be formed on the internal walls of the airfoil half-sections or on the insert to support and accurately space the insert member from the internal walls so as to optimize impingement cooling.

2 Claims, 4 Drawing Sheets

IMPINGEMENT COOLED AIRFOIL WITH BONDING FOIL INSERT

This is a continuation of application Ser. No. 07/787,345 filed Nov. 4, 1991, abandoned.

CROSS REFERENCE TO RELATED APPLICATIONS

Reference is hereby made to the following co-pending U.S. patent application dealing with related subject matter and assigned to the Assignee of the patent invention: "Method for Joining Single Crystal Members and Improved Foil Therefor" by Ramgopal Darolia, et al., assigned U.S. Ser. No. 07/615,553 and filed Nov. 19, 1990 (13DV-8528).

BACKGROUND OF THE INVENTION

1. Field of the Invention

The present invention relates generally to blades and vanes for gas turbine engines and particularly relates to the cooling of such airfoils using a formed insert with perforations. The insert also functions as a bonding foil at the joints formed between bonded surfaces of the airfoils.

2. Description of Prior Developments

Traditionally, airfoils for gas turbine engines have been internally cooled using various inserts and baffles which are inserted into the airfoils during the manufacturing cycle to direct cooling fluid against the internal surfaces of the airfoils in the form of numerous high velocity air streams or air jets. Such cooling, known as impingement cooling, is usually quite effective in maintaining the temperature of the airfoils within acceptable limits.

Unfortunately, the design of such internally cooled airfoils is compromised by the need to position the inserts or baffles within the interior of the airfoils after they have been formed. That is, the interiors of the airfoils must be dimensioned to allow the subsequent assembly of the baffles therein. This can limit the shape of the final airfoil contours.

It is also known that by allowing the cooling air to flow over the outer surface of an airfoil in the form of a thin film, the airfoil will run cooler. Generally, however, the more cooling air which is used to cool the airfoils, the less efficient is the operation of the gas turbine engine.

Accordingly, a need exists for an airfoil which is internally-cooled with inserted baffles and which is fabricated in such a manner that the airfoil design is not compromised by the necessity of providing internal clearances for positioning and assembling the baffles therein.

Moreover, a need continually exists for more efficient use of valuable cooling air in order to improve the overall efficiency of gas turbine engine performance. One approach to improving the effectiveness of the cooling air is to improve the rate of heat transfer from the heated airfoil surfaces being cooled to the cooling fluid flowing over these surfaces. By combining several modes of heat transfer in a single cooling air circuit, a more efficient and effective level of heat transfer may be achieved.

SUMMARY OF THE INVENTION

The present invention has been developed to fulfill the needs noted above and therefore has as an object the highly efficient use of cooling air for cooling both the internal and external surfaces of a gas turbine engine airfoil, without compromising its aerodynamic design.

Another object of the invention is to use a diffusion bonding foil as both an impingement baffle and as a bonding agent for fabricating an airfoil from at least two airfoil half-sections.

Another object of the invention is to use a diffusion bonding foil as a heat pipe for conducting heat away from selected portions of an airfoil.

Another object of the invention is to use a diffusion bonding foil as an impingement baffle insert without compromising the airfoil design.

Still another object of the invention is to reduce the cost of fabrication of airfoils presently employing multipass cooling channels by substituting an equally effective and lower cost impingement cooling system in its place.

Yet another object of the invention is to efficiently combine conduction cooling, impingement cooling and film cooling in combination with a diffusion bonded airfoil.

Briefly, the invention is directed to a diffusion bonded airfoil which includes an internal insert member serving as an impingement baffle and formed of one or more diffusion bonding foils. The insert member may be prefabricated from perforated stock material and sandwiched between a pair of airfoil half-section castings. The prefabricated insert member and half-section castings are assembled together and inserted within a bonding fixture or mold, placed in an oven and subjected to elevated temperatures and pressures associated with activated diffusion bonding practices.

Because the insert member becomes virtually homogeneous with the airfoil half-section castings along and through the diffusion bonding or faying surfaces, an extremely efficient conduction of heat from the half-section castings to the insert member may take place at each diffusion bonding location. This allows the insert member to act as a heat pipe which conducts heat away from the diffusion bonds. This heat is then efficiently removed or transferred from the insert member by cooling air which passes through the perforations in the insert member in the form of high velocity air jets.

The insert member is advantageously positioned in close proximity to the internal walls of the airfoil so that the high velocity air jets may impact or splash against them so as to effect impingement cooling. The cooling air then passes through holes formed through the walls of the airfoil so as to provide film cooling along the external surfaces of the airfoil.

The aforementioned objects, features and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWINGS

In the Drawings.

In the various figures of the drawing, like reference characters designate like parts.

DETAILED DESCRIPTION OF THE PREFERRED EMBODIMENTS

Figure 1:
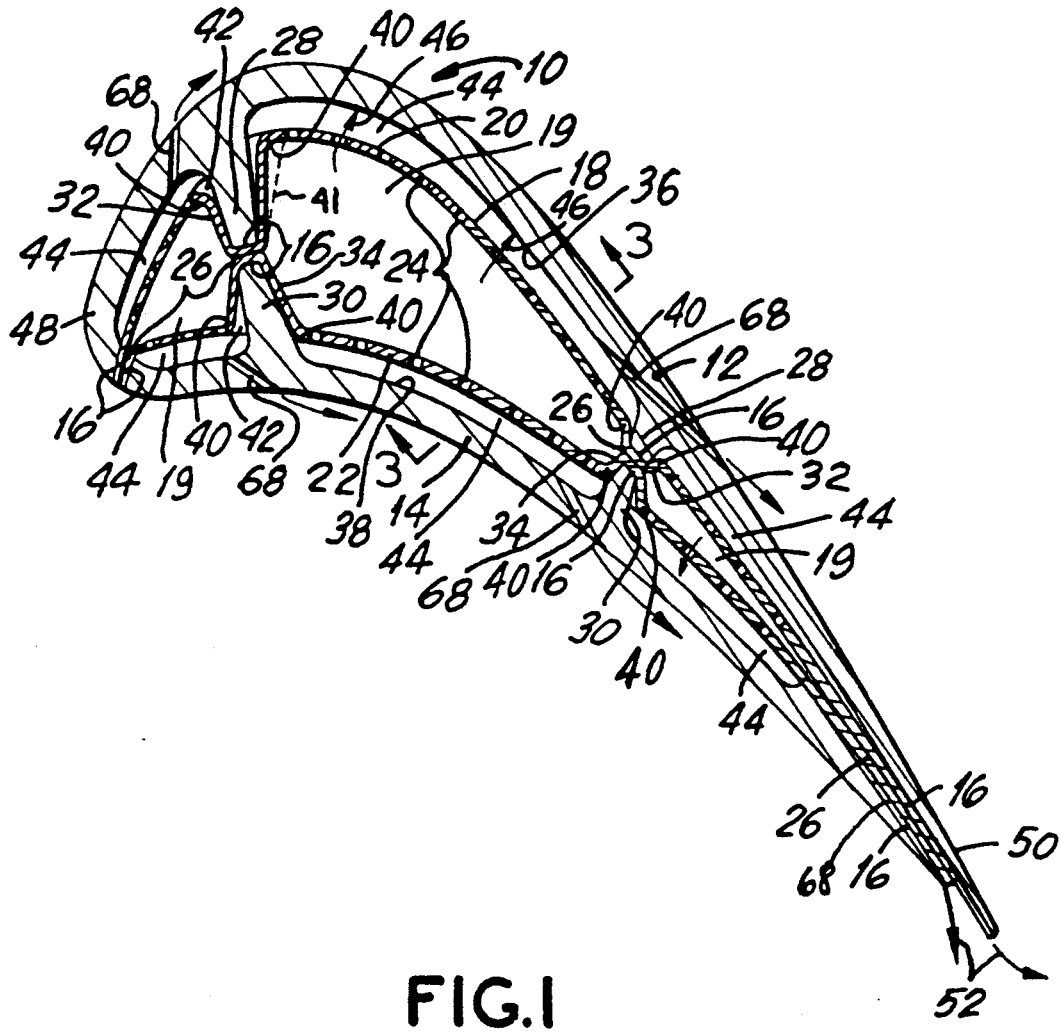
FIG. 1 is a sectional view taken through line A—A of FIG. 2 showing an airfoil constructed in accordance with the invention.

The invention will now be described in conjunction with FIG. 1 which shows an airfoil 10 fabricated from a pair of diffusion bonded half-section elements or castings 12,14. The half-section castings are diffusion bonded together along their confronting bonding or faying surfaces 16 via insert member 18. Diffusion bonding may be carried out in a conventional fashion, for example, as described in U.S. Pat. No. 4,089,456.

Insert member 18 may be prefabricated from at least one or from a pair of diffusion bonding foils 20,22. The bonding foils 20,22 may be perforated prior to final forming while in flat sheet form. Perforations 24 may be formed by any suitable method such as stamping, EDM or laser machining. The perforations 24 allow insert member 18 to act as a one-piece impingement baffle which can direct cooling air toward each of the internal walls 36,38 of airfoil 10.

After the perforations are formed, each bonding foil may be individually stamped to a desired shape and then joined together to form integral insert member 18. Such joining may be achieved, for example, by forming resistance welds at abutment points 26. Insert member 18 defines several radially-extending internal chambers or passageways 19 for the passage of cooling fluid therethrough.

The one-piece or integral insert member 18 may then be coated with boron or other suitable melting point depressant at those selected points or areas where the insert member is to contact and be diffusion bonded to the half-section castings. Boron, as is well known, facilitates the formation of a diffusion bond. As seen in FIG. 1, insert member 18 is boronized along each surface which abuts the faying surfaces 16. Moreover, the abutting surfaces between the bonding foils along abutment points 26 should be coated with boron or covered with a layer of boron tape prior to joining the foils 20,22. These foils may then require hot-sizing after boronizing in order to obtain their final desired shape.

Each half-section casting 12,14 includes a pair of radially extending ribs 28,30 which are machined so as to accurately align with and confront one another. Complimentary channel-shaped sections or ribs 32,34 may be formed in each bonding foil 20,22 to allow the insert member 18 to fit within airfoil 10. The ribs 32,34 match the contours of and fit around and between ribs 28,30 and provide a large insert member surface area adjacent each rib 28,30 and each opposed inner wall 36,38 of the airfoil.

Figure 2:
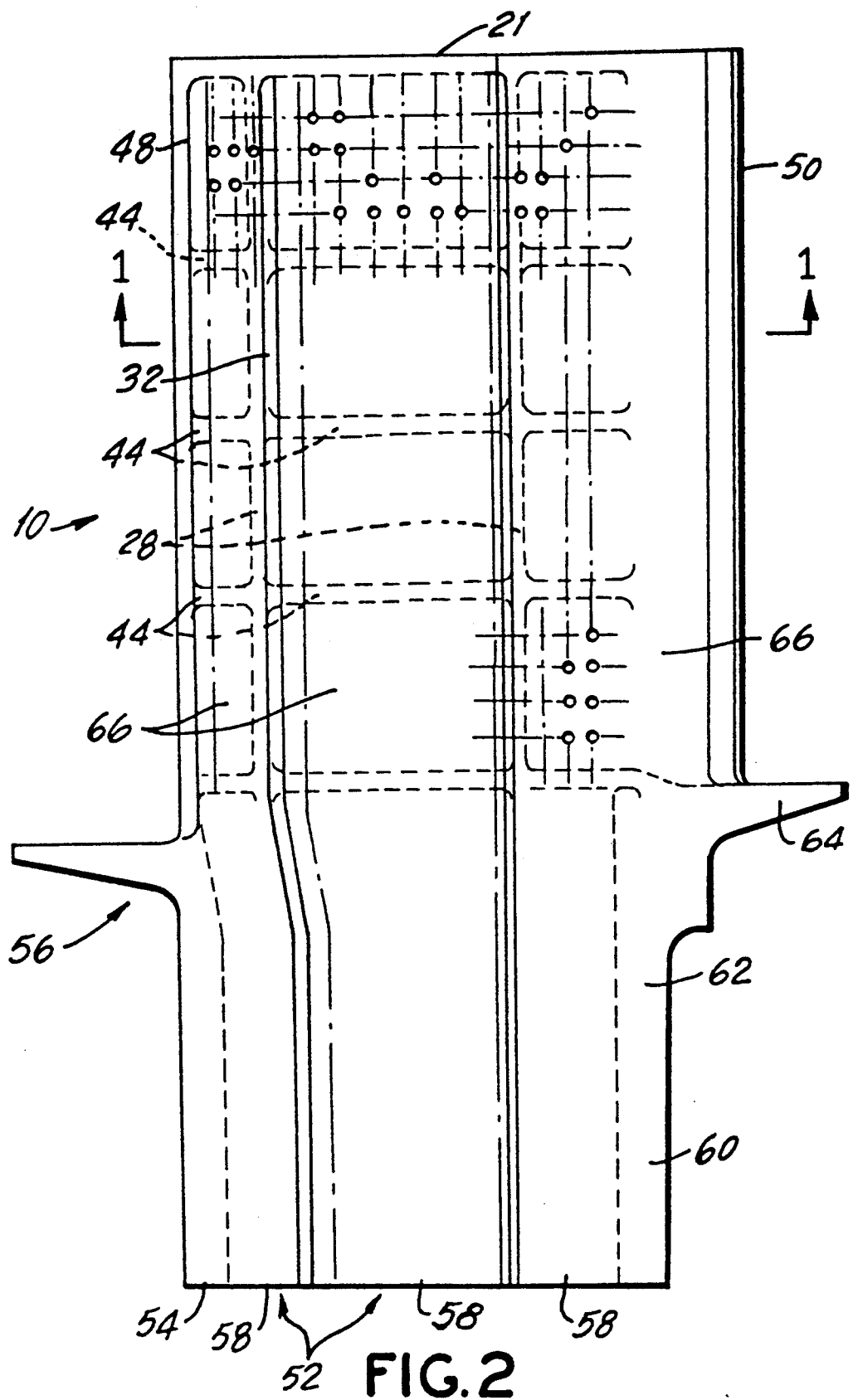
FIG. 2 is a sectional view taken through a turbine blade fitted with an insert member in accordance with the invention.

In the example shown in FIGS. 1 and 2, each channel-shaped rib 32,34 formed on insert member 18 is carefully dimensioned to abut its corresponding faying surface 16 of airfoil 10 so as to allow the formation of a diffusion bond along and through these contacting surfaces.

Because the insert member 18 is sandwiched between the half-section castings prior to diffusion bonding, the shape or contour of the insert member 18 need not be limited to a straight or line-of-sight configuration generally associated with non-diffusion bonded airfoils. That is, with one-piece cast airfoils, inserts or impingement baffles had to be inserted in a substantially straight line into the interior of the airfoil through a slot in the bottom 54 of the blade or through its open tip. This insertion requirement compromised the final airfoil design. Such limitations do not apply to the insert member of the present invention which may be easily sandwiched between the two half-section castings 12,14 prior to their joining via diffusion bonding.

An important feature of the invention is the formation of bends or elbows 40 in insert member 18. These bends are dimensioned to provide a clearance 42 between the insert member and the ribs 28,30. This clearance allows the relatively cool insert member 18 to thermally expand and contract virtually independently of the hotter airfoil 10 without subjecting the insert member to excessive stress.

The bends or elbows 40 allow the insert member to freely expand and contract in the manner of a bellows without interference with the interior walls or ribs of airfoil 10. As seen in phantom in FIG. 1, when the airfoil 10 is heated, each elbow 40 freely moves to a position such as represented at 41.

Figure 3:
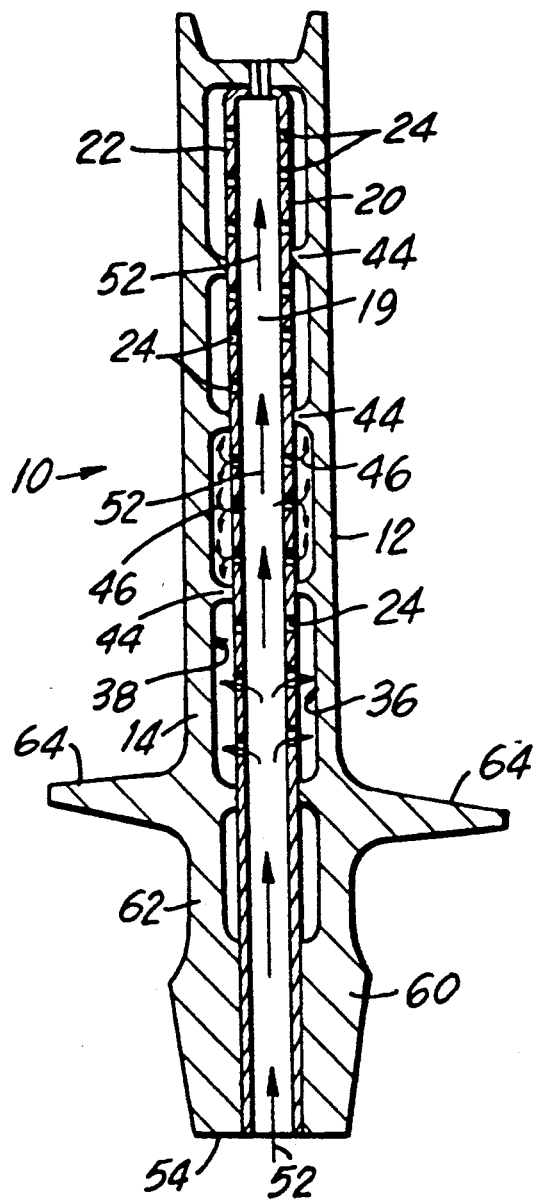
FIG. 3 is a sectional view taken through line B—B of FIG. 1.
Figure 4:
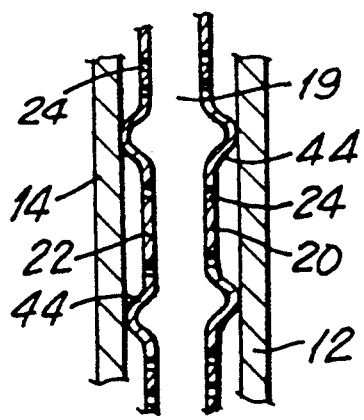
FIG. 4 is a fragmental sectional view similar to FIG. 3 showing standoff ribs formed on the insert member rather than on the airfoil walls.

In order to optimize the effectiveness of the impingement cooling of the inner walls 36,38 of airfoil 10, a series of radially-spaced horizontal or axially-extending ribs 44 may be formed along these walls as shown in FIGS. 2 and 3. Ribs 44 may be formed during the casting process or by machining each half-section casting 12,14 prior to diffusion bonding. This is the same method that would be used to form the inner walls of the airfoil cavity. Alternatively, the radially-spaced axially-extending ribs 44 may be formed on the insert member 18 during formation of bonding foils 20,22 as schematically shown in FIG. 4.

The purpose of the ribs 44 is to support and maintain the insert member 18 at a predetermined standoff spacing from the inner walls 36,38 so that air jets 46 (FIG. 1) flowing through perforations 24 impact the inner walls 36,38 at a predetermined velocity. Ribs 44 may extend from a point adjacent to the leading edge 48 of airfoil 10 to a point adjacent to its trailing edge 50 to provide adequate support to insert member 18 as it is subjected to the forces of pressurized cooling air 52.

The outer surface of the airfoil may be cast to size, or machined by ECM, EDM or the like. The final bond lines or faying surfaces may be machined to size by EDM or any other suitable method to provide the required gap between them for accepting the insert member 18 for diffusion bonding.

A typical cooling fluid flowpath or circuit is shown in FIGS. 1, 2 and 3 wherein cooling air 52 (FIG. 2) enters the bottom 54 of turbine blade 56 through inlets 58 and travels radially upwardly or outwardly through dovetail 60 and shank 62. The cooling air 52 continues to flow through and past blade platform 64 and into internal cavities or chambers 19 (FIG. 1) located within the airfoil portion of the blade. As the pressurized cooling air 52 flows upwardly through each chamber 19, it is forced through perforations 24 in insert member 18.

Air jets 46 are formed as cooling air 52 passes through perforations 24 formed adjacent each chamber 19. The air jets 46 impinge against the inner walls 36,38 of airfoil 10 and effect a scrubbing action which efficiently removes heat from the airfoil. As noted, ribs 44 (FIG. 3) serve to space insert member 18 at an optimum impingement distance from walls 36,38. This distance, i.e., 0.060 inch, ensures efficient cooling of the walls. Ribs 44 also act as air flow dams which follow the internal contours of the airfoil walls and channel the cooling air 52 through film cooling holes 68 formed through the walls 36,38 of airfoil 10 and through the trailing edge 50.

The film cooling holes 68 allow the spent cooling air 52 to pass over the exterior or outer surfaces of airfoil 10 to provide film cooling of these surfaces. Moreover, the cooling holes 68 formed adjacent and through the trailing edge 50 provide highly efficient cooling along this region of the airfoil.

Preferably, insert member 18 extends radially throughout the entire length of turbine blade 56 and functions as an integral part of the turbine blade although perforations 24 need only be formed above platform 64 with that portion below platform 64 being left solid or it may also be perforated based on the expected metal temperatures. Insert member 18 supplies and meters the cooling air 52 as required to each of the airfoil compartments or chambers 66 and further functions as a diffusion bonding foil which forms a critical function in the fabrication of the turbine blade or nozzle vane.

Because the insert member 18 contacts the horizontal ribs 44 and is bonded to the half-section castings 12,14 all along the leading and trailing edges of airfoil section 10 as well as along radial ribs 28,30, the insert member acts as a heat pipe and cools these areas of contact by conducting heat away from the ribs and diffusion bond joint areas. The heat transfer effectiveness of this design is greater than normally achieved with current designs due to the full impingement cooling coverage of the airfoil surfaces, the heat pipe effects and improved trailing edge cooling. The costs associated with this type of fabrication are less than an equivalent blade design that relies upon a conventional multipass cooling circuit.

Figure 5:
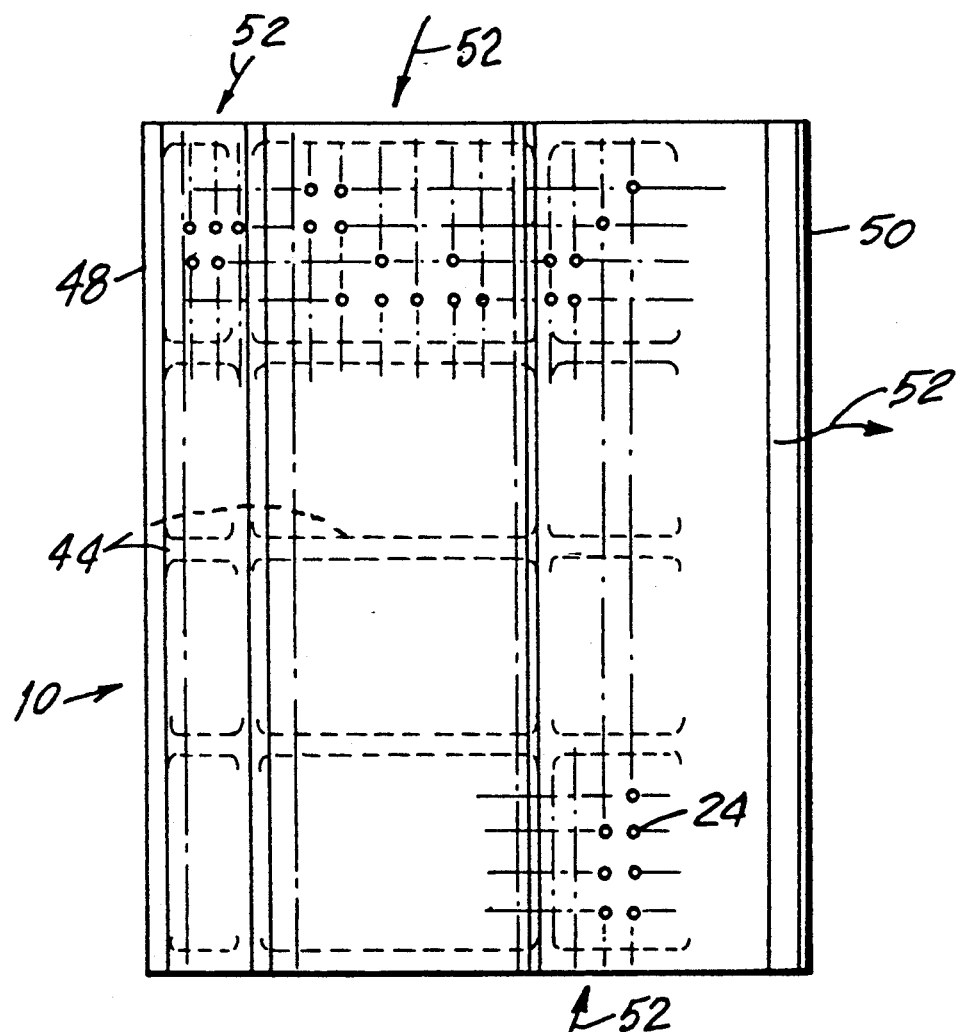
FIG. 5 is a sectional view taken through a turbine vane fitted with an insert member in accordance with the invention.

The present invention applies equally to a nozzle vane as it does to a blade. An example of a vane designed in accordance with the present invention is shown in FIG. 5.

Obviously, numerous modifications and variations of the present invention are possible in the light of the above teachings. It is therefore to be understood that within the scope of the appended claims, the invention may be practiced otherwise than as specifically described herein.

What is claimed is:

1. An airfoil for a gas turbine engine, said airfoil having a leading edge and a trailing edge and comprising:
   at least 2 diffusion bonded half-section elements having opposed internal walls; and
   an insert member diffusion bonded between said elements and disposed adjacent to said internal walls, said insert member defining a plurality of radially extending passageways for conducting cooling fluid therethrough and having a plurality of perforations formed therein so as to form an impingement baffle along each of said internal walls for directing said cooling fluid at said internal walls,
   wherein each of said half section elements comprises rib means projecting inwardly from said internal walls and wherein said insert member is diffusion bonded to said rib means,
   wherein said insert member comprises channel-shaped sections which fit around said rib means, and
   wherein said channel-shaped sections are formed with bend portions which provide a clearance between said channel-shaped sections and said rib means.

2. An airfoil for a gas turbine engine, said airfoil having a leading edge and a trailing edge and comprising:
   at least two diffusion bonded half-section castings having opposed internal walls interconnected by a diffusion bond extending radially coextensive with said leading edge and said trailing edge; and
   an insert member diffusion bonded between said castings so as to form said diffusion bond and disposed adjacent to said internal walls, said insert member defining a plurality of radially extending passageways for conducting cooling fluid therethrough and having a plurality of perforations formed therein so as to form an impingement baffle along each of said internal walls for directing said cooling fluid at said internal walls,
   wherein each of said half section castings comprises rib means projecting inwardly from said internal walls and wherein said insert member is diffusion bonded to said rib means,
   wherein said insert member comprises channel-shaped sections which fit around said rib means, and
   wherein said channel-shaped sections are formed with bend portions which provide a clearance between said channel-shaped sections and said rib means.

* * * * *